US008149432B2

(12) United States Patent
Kizaki et al.

(10) Patent No.: US 8,149,432 B2
(45) Date of Patent: Apr. 3, 2012

(54) INFORMATION PROCESSING APPARATUS, METHOD, AND RECORDING MEDIUM STORING PROGRAM FOR MODIFYING PRINT INSTRUCTIONS

(75) Inventors: Junichiro Kizaki, Kanagawa (JP); Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/907,831

(22) Filed: Oct. 19, 2010

(65) Prior Publication Data
US 2011/0032560 A1 Feb. 10, 2011

Related U.S. Application Data

(62) Division of application No. 10/352,076, filed on Jan. 28, 2003, now Pat. No. 7,839,510.

(30) Foreign Application Priority Data

Jan. 31, 2002 (JP) .................................. 2002-023563

(51) Int. Cl.
*G06F 3/12* (2006.01)
*G06K 9/03* (2006.01)

(52) U.S. Cl. .......... 358/1.13; 358/1.1; 358/1.2; 358/1.9; 358/1.12; 358/1.14; 358/1.15; 358/1.16; 358/1.17; 358/1.18; 358/1.8; 358/2.1; 358/3.02; 358/3.11; 358/3.12; 358/3.23; 358/3.31; 358/450; 358/453; 358/468; 358/527; 399/15; 399/2; 399/10; 399/16; 399/44; 399/55; 399/66; 399/67; 399/77; 399/79; 399/81; 399/82; 399/86; 399/87; 399/370; 399/381; 399/389; 399/401; 399/407; 399/410; 382/173; 382/174; 382/176; 382/292; 382/293; 382/295; 382/289; 382/309; 382/312; 400/4; 400/61; 400/78; 400/103; 400/171; 400/172; 400/188; 400/279; 400/281; 400/527; 400/583.1

(58) Field of Classification Search .................. 358/1.1, 358/1.2, 1.9, 1.12, 1.13, 1.14, 1.15, 1.16, 358/1.17, 1.18, 2.1, 3.02, 3.11, 3.12, 3.31, 358/450, 453, 468, 518, 527; 399/15, 20, 399/16, 44, 55, 66, 67, 77, 79, 81, 82, 86, 399/87, 370, 381, 401, 407, 410; 382/173, 382/174, 176, 290, 291, 292, 293, 295, 289, 382/309, 312
See application file for complete search history.

(56) References Cited

U.S. PATENT DOCUMENTS
4,120,034 A 10/1978 Fisk et al.
(Continued)

FOREIGN PATENT DOCUMENTS
JP 03-254764 * 11/1991
(Continued)

*Primary Examiner* — Steven Kau
(74) *Attorney, Agent, or Firm* — Fitzpatrick, Cella, Harper & Scinto

(57) ABSTRACT

An information processing apparatus that can be connected to an image-forming apparatus, a method, and a program used for the information processing apparatus are disclosed. The information processing apparatus comprises a control unit for controlling print-setting information set for document data to be printed, a recognition unit for recognizing information about a first function specified by the print-setting information by translating the print-setting information controlled by the control unit, an obtaining unit for obtaining information about a second function of the image-forming apparatus connected to the information processing apparatus, a determination unit for determining whether or not the image-forming apparatus can perform the first function recognized by the recognition unit based on the second-function information obtained by the obtaining unit, and a modification unit for modifying the print-setting information controlled by the control unit based on the determination result.

6 Claims, 11 Drawing Sheets

U.S. PATENT DOCUMENTS

| | | | |
|---|---|---|---|
| 5,384,620 A * | 1/1995 | Ebner et al. | 399/1 |
| 5,580,177 A | 12/1996 | Gase et al. | |
| 5,847,857 A | 12/1998 | Yajima et al. | |
| 5,954,436 A | 9/1999 | Kageyama et al. | |
| 5,987,227 A | 11/1999 | Endo et al. | |
| 5,993,088 A * | 11/1999 | Nogay et al. | 400/78 |
| 5,996,029 A * | 11/1999 | Sugiyama et al. | 710/15 |
| 6,034,783 A | 3/2000 | Honma et al. | |
| 6,120,197 A * | 9/2000 | Kawamoto et al. | 400/61 |
| 6,246,485 B1 | 6/2001 | Brown et al. | |
| 6,466,326 B1 | 10/2002 | Toshihiro | |
| 6,927,865 B1 | 8/2005 | Kujirai et al. | |
| 6,952,274 B2 | 10/2005 | Tomitaka | |
| 6,975,415 B2 | 12/2005 | Yamade | |
| 7,046,385 B2 * | 5/2006 | Mori et al. | 358/1.15 |
| 7,092,111 B2 | 8/2006 | Nishikawa et al. | |
| 2002/0067508 A1 * | 6/2002 | Nishikawa et al. | 358/1.18 |

FOREIGN PATENT DOCUMENTS

| | | |
|---|---|---|
| JP | 03-254964 * | 11/1991 |
| JP | 07-223341 | 8/1995 |
| JP | 07-271702 | 10/1995 |
| JP | 09-179704 | 11/1997 |
| JP | 10-123885 | 5/1998 |
| JP | 2000215013 | 8/2000 |
| JP | 2001256012 | 9/2001 |
| JP | 2001-318778 | 11/2001 |
| JP | 2001350606 | 12/2001 |
| JP | 2002-023985 | 1/2002 |

* cited by examiner

FIG. 5

| NAME OF PRINTER DEVICE | Printer1 | 501 |
|---|---|---|
| NAME OF DOCUMENT DATA FOR PRINTING | Test | 502 |
| PAGE NUMBER ASSIGNED TO SHEET | 2 | 503 |
| SHEET-FEED TRAY | UPPER TRAY | 504 |
| NUMBER OF COPIES TO BE PRINTED | 1 | 505 |
| SHEET-EJECT TRAY | UPPER TRAY | 506 |
| RESOLUTION | 600 | 507 |
| PAGE TO BE PRINTED | 1~10 | 508 |
| SHEET-FEED CASSETTE INFORMATION | UPPER | 509 |
| STAPLE | YES | 510 |

FIG. 6

| ROW NUMBER 600 | IDENTIFIER (ID) 601 | SIZE AND ORIENTATION 602 | FRONT/ REVERSE DATA 603 | PAGE NUMBER 604 | ENLARGEMENT/ REDUCTION FACTOR 605 | DATA PRINTING POSITION 606 |
|---|---|---|---|---|---|---|
| 607 | SHEET 1 | A4 VERTICAL | FRONT | DOCUMENT PAGE 1 | 70% | LEFT HALF |
| 608 | | | | DOCUMENT PAGE 2 | 70% | RIGHT HALF |
| 609 | | | REVERSE | DOCUMENT PAGE 3 | 70% | LEFT HALF |
| 610 | | | | DOCUMENT PAGE 4 | 70% | RIGHT HALF |
| 611 | SHEET 2 | A4 HORIZONTAL | FRONT | DOCUMENT PAGE 5 | 70% | LEFT HALF |
| 612 | | | | DOCUMENT PAGE 6 | 70% | RIGHT HALF |
| 613 | | | REVERSE | DOCUMENT PAGE 7 | 70% | LEFT HALF |
| 614 | | | | DOCUMENT PAGE 8 | 70% | RIGHT HALF |

FIG. 7

| NAME OF PRINTER DEVICE | Printer1 |
|---|---|
| NAME OF DOCUMENT DATA TO BE PRINTED | Test |
| PAGE NUMBER ASSIGNED TO SHEET | 2 |
| SHEET-FEED TRAY | UPPER TRAY |
| NUMBER OF COPIES TO BE PRINTED | 1 |
| SHEET-EJECT TRAY | UPPER TRAY |
| RESOLUTION | 600 |
| PAGE TO BE PRINTED | 1～10 |
| SHEET-FEED CASSETTE INFORMATION | UPPER |
| STAPLE | NO |

FIG. 8

| | | | | 801 | | 803 | | 805 | | 807 |
|---|---|---|---|---|---|---|---|---|---|---|
| SHEET 1 | A4 VERTICAL | FRONT | DOCUMENT PAGE 1 | 70% | LEFT HALF |
| | | | DOCUMENT PAGE 2 | 70% | RIGHT HALF |
| SHEET 2 | A4 VERTICAL | FRONT | DOCUMENT PAGE 3 | 70% | LEFT HALF |
| | | | DOCUMENT PAGE 4 | 70% | RIGHT HALF |
| SHEET 3 | A4 HORIZONTAL | FRONT | DOCUMENT PAGE 5 | 70% | LEFT HALF |
| | | | DOCUMENT PAGE 6 | 70% | RIGHT HALF |
| SHEET 4 | A4 HORIZONTAL | FRONT | DOCUMENT PAGE 7 | 70% | LEFT HALF |
| | | | DOCUMENT PAGE 8 | 70% | RIGHT HALF |

INFORMATION PROCESSING APPARATUS, METHOD, AND RECORDING MEDIUM STORING PROGRAM FOR MODIFYING PRINT INSTRUCTIONS

This application is a divisional application of application Ser. No. 10/352,076, filed Jan. 28, 2003 now U.S. Pat. No. 7,839,510 (now allowed), the contents of which are incorporated herein by reference.

BACKGROUND OF THE INVENTION

1. Field of the Invention

The present invention relates to an information processing apparatus that can be connected to an image-forming apparatus, an information processing method, and a recording medium storing a program used for the information processing apparatus.

2. Description of the Related Art

Recently, Print on Demand (POD) Systems storing data of a document such as a manual, a catalog, and meeting material as electronic data, and printing as many copies of the stored electronic data as necessary are widely used. Unlike the situation where a normal printing system is used, the user of a POD system does not have to use a printer driver of the POD system to set the setting data for document data to be printed. The setting data includes information such as which printer should be used for printing, in what style the document data should be laid out, and which function should be used for performing printing and finishing the document. The POD system can store and control the setting data using an application run in the POD system.

In the situation where the POD system is used, the print-setting data and the document data to be printed can be controlled together as one electronic document file. According to some systems, the electronic document file, including the print-setting data can be controlled by applications used in the systems and not by the device drivers. By using the electronic document file, which includes the print-setting data and the document data, it becomes possible to print according to the print-setting data, even though the user who set the print-setting data is not present. That is to say, it is not necessary to generate and input print-setting data repeatedly.

However, unlike a device driver, the application cannot directly control information of the output device. Therefore, when a user tries to store and control the print-setting data by using the application, there may be a difference between a function specified by the print-setting data and a function of the output device.

For example, when a user tries to print document data, an image-forming apparatus that is specified as the output device may not be able to perform the function specified by the print-setting data when optional functions of the image-forming apparatus may have been added, deleted, or modified. Also, in the situation where the image-forming apparatus specified as the output device by the print-setting data does not exist because of moving or the like, it is impossible to print the document data.

Further, in the situation where an output device that is different from the output device specified by the user who created the electronic document file is used for printing the document data, the different output device may not be able to perform the function specified by the electronic document file.

If the user performs printing of the document data according to the print-setting data when the function specified by the setting data and the function of the output device do not match, as in the above-described case, the printing process will be terminated or the printed result would be different from what was expected by the user. Further, when someone who is not the maker of the electronic document file tries to print the document data, he/she may not be able to determine how the document data should be printed. Therefore, sometimes it must be the creator of the electronic document file who determines whether or not the setting data is appropriate for printing the document data.

SUMMARY OF THE INVENTION

Accordingly, one feature of the present invention is to provide a system that includes an information processing apparatus that can be connected to an image-forming apparatus. By using an image-forming apparatus, a user of the system can properly output document data to be printed without performing complicated procedures when a function specified by print-setting data set for the document data and a function of the image-forming apparatus do not match with each other.

Another feature of the present invention is to provide another system that includes an image-forming apparatus. When the document data to be printed and the print-setting data set for the document data to be printed are controlled by an application used in the system, and when the function of the image-forming apparatus is modified, the print-setting data is automatically modified and is output so that the image-forming apparatus can perform printing according to the modified print-setting data. Accordingly, it becomes possible to properly perform printing.

For achieving at least one of the above-described features, the present invention is configured, for example, as below.

According to an aspect of the present invention, an information processing apparatus that can be connected to an image-forming apparatus is provided. The information processing apparatus comprises a control unit for controlling print-setting information set for document data to be printed. Further, the information processing apparatus comprises a recognition unit for recognizing information about first function specified by the print-setting information by translating the print-setting information controlled by the control unit. Further, the information processing apparatus comprises an obtaining unit for obtaining information about a second function of the image-forming apparatus connected to the information processing apparatus. Further, the information processing apparatus comprises a determination unit for determining whether or not the image-forming apparatus can perform the first function recognized by the recognition unit based on the information about the second function obtained by the obtaining unit. Still further, the information processing apparatus comprises a modification unit for modifying the print-setting information controlled by the control unit based on the result of the determination performed by the determination unit.

Of course, the present invention can be configured as an apparatus and a method for controlling the apparatus, or a control program and a recording medium storing the control program.

Other features and advantageous of the present invention will be apparent from the following description taken in conjunction with the accompanying drawings, in which like reference characters designate the same or similar parts throughout.

BRIEF DESCRIPTION OF THE DRAWINGS

FIG. 5 illustrates a printer instruction shown in FIG. 4.

FIG. 6 illustrates an example of page-layout information shown in FIG. 4.

FIG. 7 shows the printer instruction after modification.

FIG. 8 shows a table showing the page-layout information after modification.

DESCRIPTION OF THE PREFERRED EMBODIMENTS

Embodiments of the present invention will now be described with reference to attached drawings.

Figure 1:
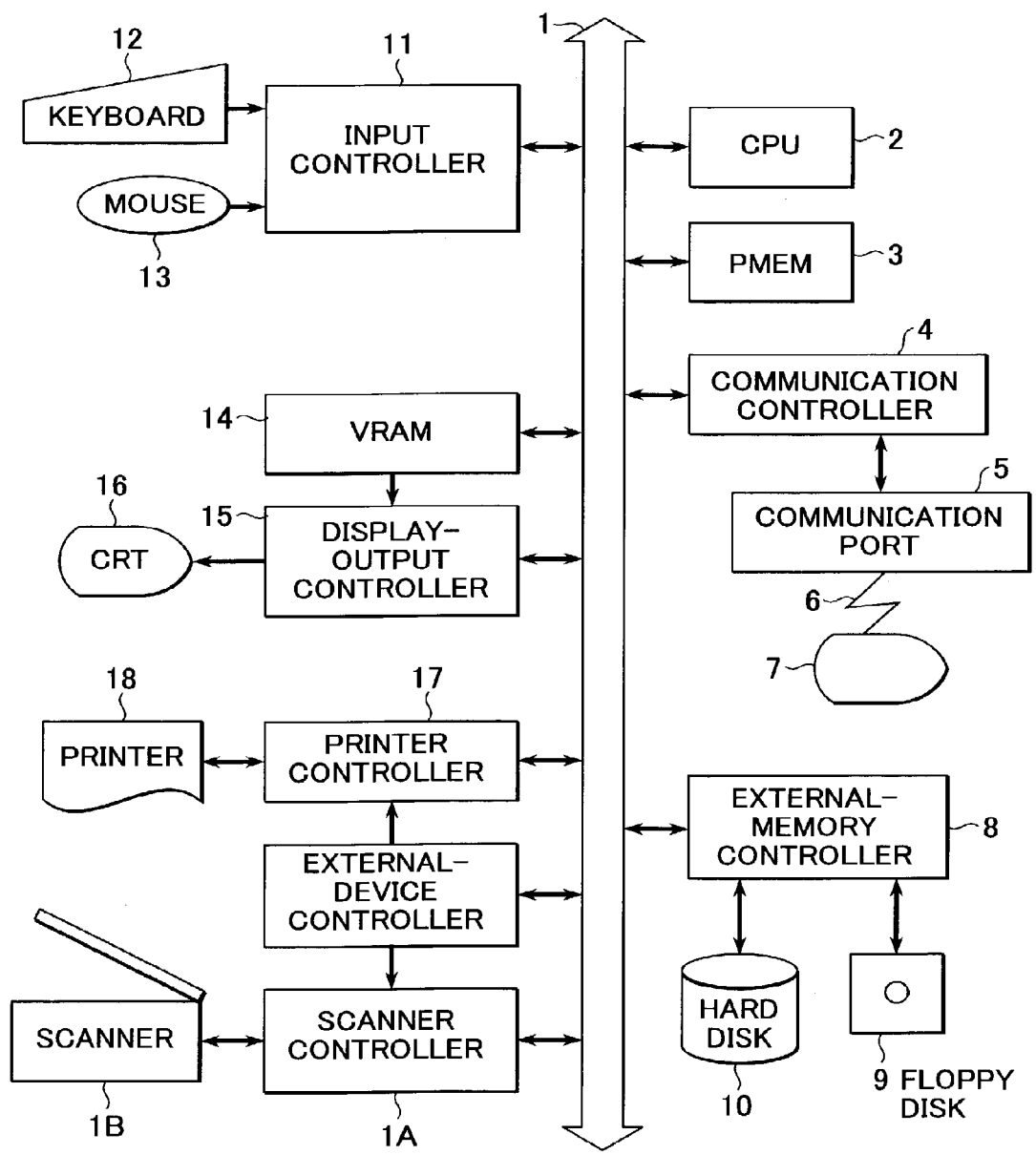
FIG. 1 is a block diagram illustrating the configuration of a host computer according to an embodiment of the present invention.

FIG. 1 is a block diagram illustrating the configuration of a host computer 100 according to an embodiment of the present invention. Reference numeral 1 indicates a system bus. The following components are all connected to the system bus 1. Reference numeral 2 indicates a CPU (a Central Processing Unit) that can be used as a typical controller for the present invention. A program memory (PMEM) 3 selects and reads a program for performing an operation according to an embodiment of the present invention from a hard disk 10, as required. The program is executed by the CPU 2. A keyboard 12 is used for inputting data. The data stored in the PMEM 3, which serves as a text memory, is stored as coded information. A communication controller 4, which is a typical communication controller of the present invention, controls data input and output from a communication port 5. The signal output from the communication port 5 is transmitted, via a communication line 6, to other communication ports of other apparatuses connected to a network 7. The host computer 100 communicates with a printer 18 and a scanner 1B that are shared on the network via the communication controller 4.

According to this embodiment, a LAN is used as the network. However, the communication port 5 and the communication line 6, which are connected to the communication controller 4, may be a regular public communication line. Reference numeral 8 indicates an external-memory controller for controlling an external memory. Reference numeral 9 indicates a floppy disk (hereinafter referred to as an FD) and reference numeral 10 indicates a hard disk (hereinafter referred to as an HD). The FD 9 and the HD 10 stores data files and various programs.

An input controller 11 is a typical input controller that can be used for the present invention. Input devices such as the keyboard 12 and the mouse 13 (an input-instruction unit) are connected to the input controller 11. To operate the system, the user of the host computer 100 inputs an instruction using the keyboard 12. In this embodiment, the mouse 13 serves as a pointing device (hereinafter referred as a PD) for inputting an instruction using image data displayed on a CRT 16. By using the mouse 13, the user arbitrarily moves the cursor on the CRT 16 in the vertical direction or in the horizontal direction and selects a command icon on a command menu for providing an operational instruction. Further, by moving the cursor, the user designates an object to be edited, a drawing position, and so forth. Reference numeral 14 indicates a video memory (hereinafter referred to as a VRAM). Reference numeral 15 indicates a display output controller. The data displayed on the CRT 16 is expanded on the VRAM 11 as bitmapped data. Reference numeral 17 indicates a printer controller for controlling data output to the printer 18. A scanner controller 1A controls the scanner 1B connected thereto. The host computer 100 serving as a scanner/server requires the scanner controller 1A and the scanner 1B. However, a computer used by a client can use the scanner controller 1A and the scanner 1B, which are shared on the network, via the communication controller 4 and the communication port 5. In the present invention, the scanner 1B and the host computer 100 serving as the scanner/server may be formed separately or integrally.

According to this embodiment, a program is stored in ROM. However, the program may be stored in the HD 10 or the FD 9 that are connected to the host computer 100 serving as the scanner/server. Further, the program may be stored on other apparatuses (not shown) connected to the host computer 100 via the network. The program of the present invention can be transmitted to other systems or apparatuses via a recording medium such as an FD or an HD, or via a network.

Figure 10:
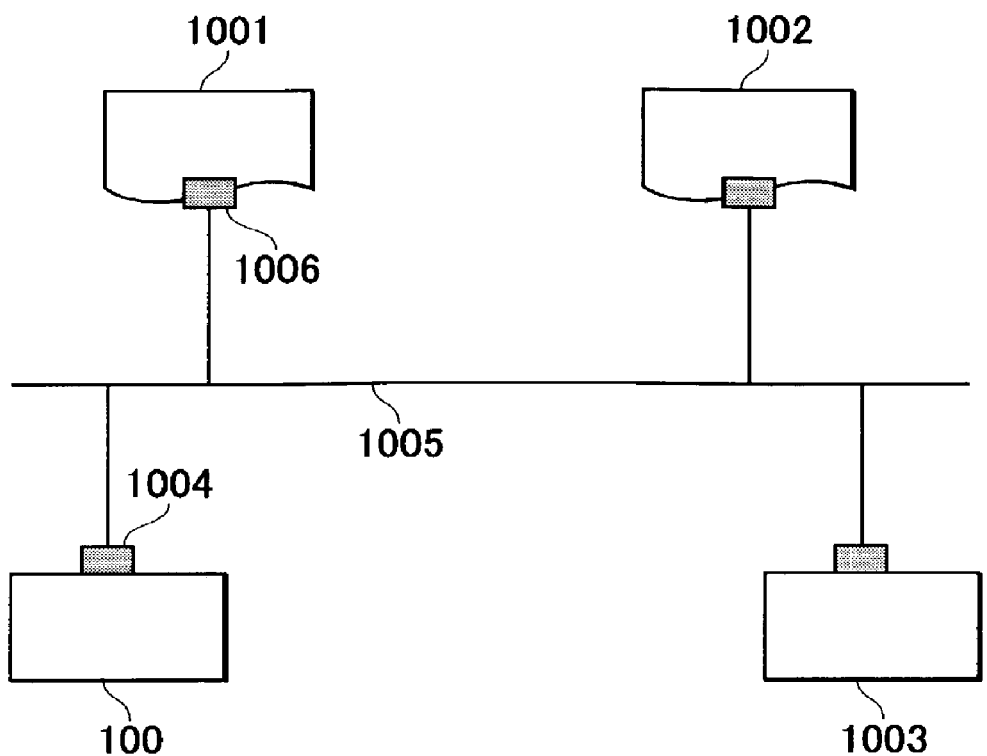
FIG. 10 illustrates a printing system according to an embodiment of the present invention.

FIG. 10 illustrates a printing system according to another embodiment of the present invention. A workstation 1003, the host computer 100 shown in FIG. 1, a printer 1001, and a copying machine 1002 are interconnected via a network interface 1004. In this system, an Ethernet network board or the like, or other wireless LAN boards may be used as the network interface 1004. The network interface 1004 includes the communication controller 4 shown in FIG. 1.

For example, a case where the user of the host computer 100 inputs print-setting data and a print command using the mouse 13 or the keyboard 12 is considered. The input data and the print command are output from the host computer 100 and transmitted to the printer 1001 via the network interface 1004, the network 1005, and network interface 1006. The printer 1001 prints according to the received print-setting data and print command.

More specifically, when staple-setting data, print commands, and the document data to be printed are transmitted to the printer 1001 from the host computer 100, the printer 1001 prints and outputs the document data according to the print command. Further, the printer 1001 is controlled so as to operate according to the staple-setting data. In this embodiment, the network 1005 is used as a transmission medium. However, a public communication line or the like may be used as the transmission medium.

Figure 11:
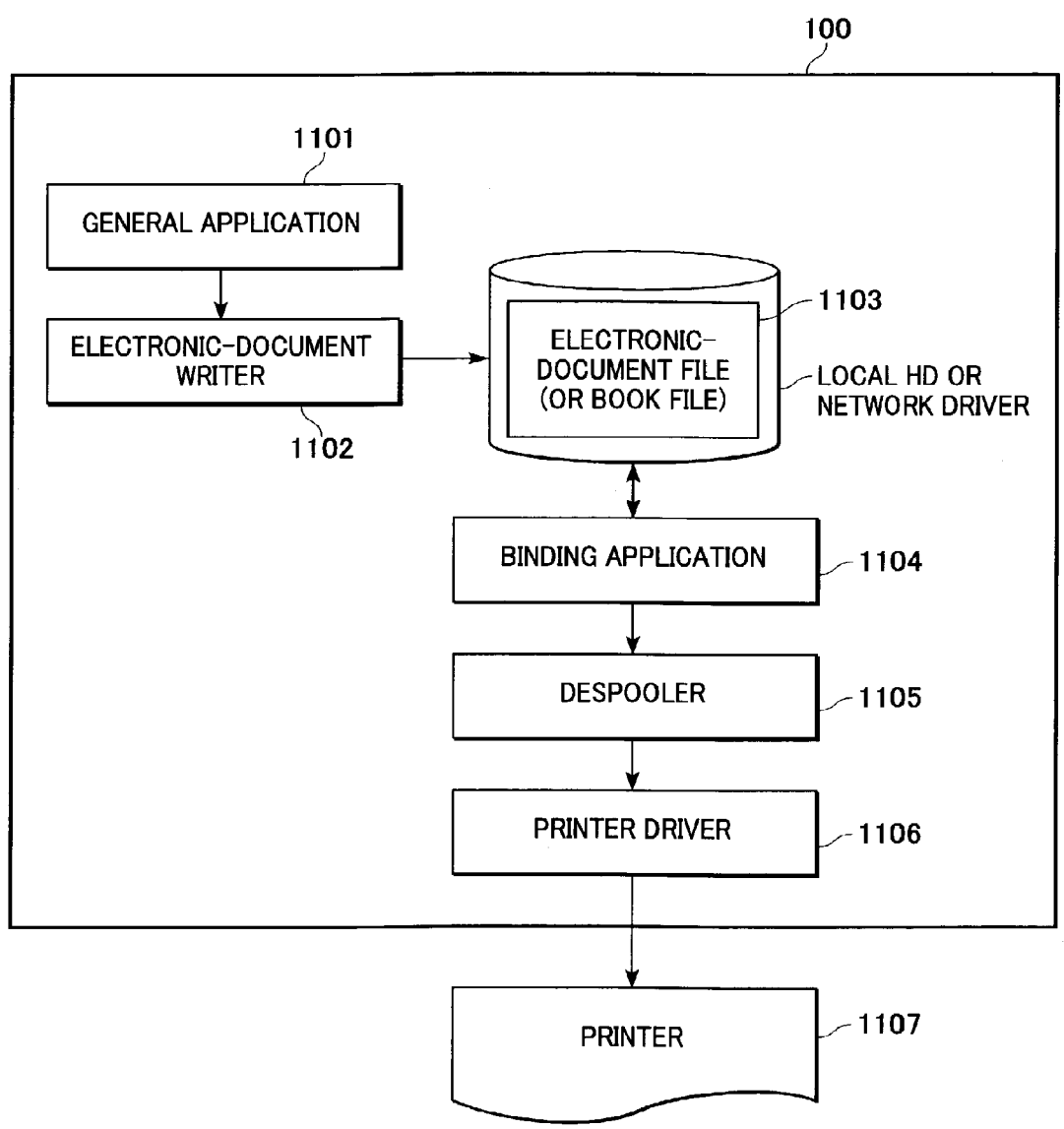
FIG. 11 illustrates software for the document-processing system according to an embodiment of the present invention.

FIG. 11 illustrates software for a document-processing system according to another embodiment of the present invention. This document-processing system is formed as a digital computer 100 (hereinafter referred to as a host computer 100). The host computer 100 is a PC, a workstation, or the like. The host computer 100 can preferably be used as an information-processing apparatus of the present invention. A general application 1101 shown in FIG. 11 includes an application program for performing word-processing, spreadsheet calculation, photo retouching, drawing, painting, presentation, text editing, and so forth. The general application 1101 generates application data that is a suitable example of the document data to be printed. Further, the general application 1101 can make an operation system (OS) of the host computer 100 perform printing. The document data to be printed includes, for example, a portable document format (PDF) document, a document made using a word processor, a table, a graph, a data document including graphic data, a page description language (PDL) data, and a printer control command.

The application 1101 uses a predetermined interface (generally referred to as a GD) provided by an OS for the printed application data such as document data or image data. That is to say, the application 1101 transmits an output command, which is predetermined according to the OS (referred to as a GDI function), to an output module of the OS, which provides the above-described predetermined interface. Upon receiving the output command, the output module converts the output command so that the output command can be processed by an output device such as a printer. Then, the output module outputs the converted output command (referred to as a GDI function). The format of the data processed by the output device differs according to the type, the manufacturer, or the model of the output device. Therefore, each output device is provided with its own device driver. The OS converts output commands by using the device driver, generates the print data, and compiles the generated print data into job units by using a command defined by a job language (a JL). Subsequently, a print job is generated. When using Windows (a trade name of Microsoft Corp. of the U.S.) as the OS, a module called a GDI (a Graphic Device Interface) is used as the output module. An electronic document writer 1102 is formed by improving the above-described device driver. The electronic document writer 1102 is a software module provided for achieving the document-processing system of the present invention.

Unlike the above-described device driver, the electronic-document writer 1102 does not merely generate the output data according to the predetermined output device. That is to say, the electronic-document writer 1102 serves as an application module for converting the output commands, so that the output commands can be processed by a binding application 1104 and a printer driver 1106 that will be described later. The format of the converted output commands (hereinafter referred to as an electronic-document format) is the same format as the document data which is to be printed. Any type of format can be used as long as it can present the style of the document in pages. Of widely used standard formats, the PDF format and PostScript (provided by Adobe Systems, Inc.), and the XML format, including an SVG format that is now gradually standardized by W3C, a standardization organization, can be used as the electronic-document format.

Using the electronic-document writer 1102 via the general application 1101, the user selects the electronic-document writer 1102 by using a screen for selecting a device driver used for output, which is displayed on the CRT 16. Then, the user performs printing.

Although the electronic-document writer 1102 is similar to a known device driver, it cannot receive data from a device. The electronic-document writer 1102 is an application program for converting application data transmitted from the general application 1101 into an electronic-document file in a predetermined format. The electronic-document file includes a print-instruction document that is an example of setting data used for controlling the printer 1107. However, the format of the electronic-document file formed by the electronic-document writer 1102 is not complete. The binding application 1104 controls the operation of the electronic-document writer 1102 based on the setting data used for controlling the printer 1107 and an operation instruction. The setting data and the operation instruction are input by the user via a setting screen displayed on the CRT 16 and a mouse 13.

Thus, the setting data for controlling the printer 1107 is transmitted to the electronic-document writer 1102 via the binding application 1104. Then, the electronic-document writer 1102 converts the application data into the electronic-document file. Subsequently, the electronic document is formed. That is to say, a new and incomplete electronic document generated by the electronic-document writer 1102 is configured and changed into an electronic-document file in a format, described later, based on various print data that is input to the binding application 1104. Hereinafter, for better understanding, a file generated by the electronic-document writer 1102 is referred to as an "electronic-document file" and an electronic-document file configured by the binding application 1104 is referred to as a "book file". However, in the case where there is no need to discriminate between the electronic-document file and the book file, they are referred to as document files (or document data). As has been described, the electronic-document file includes the document data to be printed on the basis of the application data and the print-instruction document that is the example of setting data used for controlling the printer 1107. The print-instruction document is used to print the document data.

Thus, by using the device-driver selection screen (not shown), the user selects the document writer 1102 including a data-conversion program in place of a device driver. When the user elects to perform printing, the general application 1101 transmits an instruction to convert the application data (the document data to be printed) into an electronic-document data in pages defined by the general application 1101. Hereinafter, the pages are referred to as logic pages or document pages. The converted electronic-document data is referred to as an electronic-document file 1103 and is stored in a recording medium such as a hard disk (an HD). A local hard disk (a local HD) 10 corresponding to the HD 10 shown in FIG. 1, can serve as the HD. For example, when the host computer 100 is connected to the network 1005, a network drive provided on the workstation 1003, which is connected to the host computer 100 via the network 1005, can serve as the HD.

The binding application 1104 reads the electronic-document file (or the book file) 1103 and offers a function for editing the electronic-document file 1103 to the user. However, the binding application 1104 cannot edit the contents of each page, but it can edit chapters and the structure of the book file in pages. The chapters and the structure of the book file will be described later.

When the book file 1103 edited by the binding application 1104 is printed, the binding application 1104 activates a despooler 1105. The despooler 1105 is a program module installed in the computer 100 with the binding application 1104. The despooler 1105 outputs image data to a printer driver to be printed the electronic-document file (or the book file) used by the binding application 1104. The despooler reads the specified book file from the local HD 10 and generates an output command appropriate for the above-described output module of the OS for each page to be printed, in the format written in the book file. Then, the despooler outputs the generated output command to the output module (not shown). At that time, a printer driver 1106 used for the printer 1107 serving as the output device is specified as a conversion program in place of the device driver. The above-described output module converts the received output command into a device command and outputs the device command to the printer driver 1106. The printer driver 1106 converts the device command into a command using a page-description language, or the like, so that the printer 1107 can translate the command. The converted command is transmitted from the printer driver 1106 to the printer 1107 via a system spooler (not shown). Upon receiving the command, the printer 1107 prints an image according to the command.

At that time, the printer 1107 controls the output according to the print-instruction document in the document file.

Figure 4:
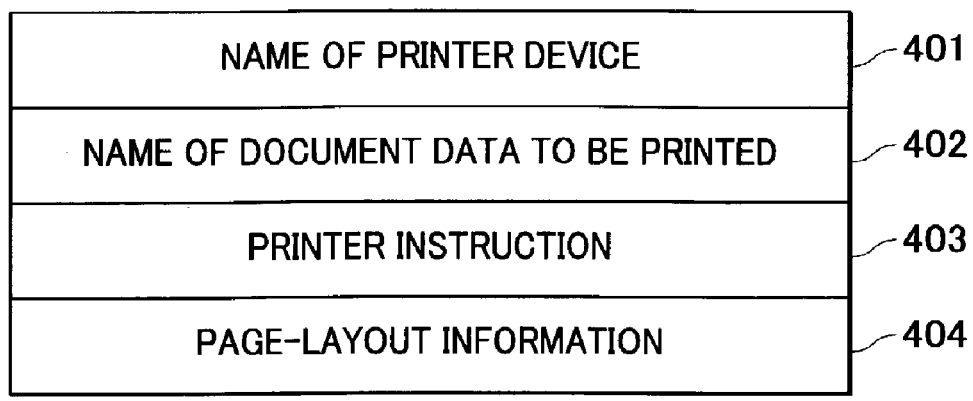
FIG. 4 illustrates a typical print-instruction document that can be processed by the document-processing system shown in FIG. 1.

FIG. 4 illustrates a typical print-instruction document that can be processed by the document-processing system shown in FIG. 1. The print-instruction document includes a name of a printer device (to which document data is output) 401, a name of document data to be printed 402, a printer instruction 403, and page-layout information 404. The page-layout information 404 stores information about the layout and printing order of each page of the document data to be printed.

FIG. 5 illustrates the printer instruction 403 shown in FIG. 4. A printer-device name 501 corresponds to the printer-device name 401 shown in FIG. 4. A document-data name 502 corresponds to the document-data name 402 shown in FIG. 4. Page number data assigned to each sheet 503, sheet-feed tray data 504, data of the number of sheets to print 505, sheet-eject tray data 506, resolution data 507, page data to be printed 508, and staple data 509 correspond to the printer instruction 403. The data written in the printer instruction 403 is the information transmitted to the printer 1107 by the despooler 1105 before the despooler 1105 transmits the document data to be printed to the printer 1107. Normally, the printer instruction 403 is controlled for each printer that is designated as a printer device. The data configuration of the printer instruction 403 is the same as that of the device information controlled by the OS used by the device driver. For example, when using Windows (a trade name of Microsoft Corp.) as the OS, values set for a printer driver are stored as data in a DEVMODE structure. However, in the present invention, data obtained from the DEVMODE data is stored as part of the print-instruction document. The print-instruction document is the setting information for the document data to be printed. The print-instruction document or the setting information includes information about how the document data should be printed. The print-instruction document or the setting information is used for controlling the output performed by the printer 1107. FIGS. 7 and 8 illustrate examples of the setting information. As shown in the drawings, the setting information includes the name of an output device, the name of the document data to be printed, a page number assigned to a sheet, sheet-feed tray specification, number of copies to be printed, a sheet-eject tray, resolution, the number of pages to be printed, whether or not the document should be stapled, the position of the staple, whether or not the document should have punch holes, the positions of the punch holes, sheet information, such as A4 vertical, information about whether printing should be performed on the front side of a sheet or on the reverse side of the sheet, and an enlargement/reduction factor. The setting information is used by the printer 1107 to control the printing. That is to say, the printer 1107 uses the setting information for performing layout processing, binding processing, and printing and outputting processing. The document data to be printed and the print-instruction document may be integrated into one document file. Otherwise, the document data and the print-instruction document may be controlled separately.

Figure 2:
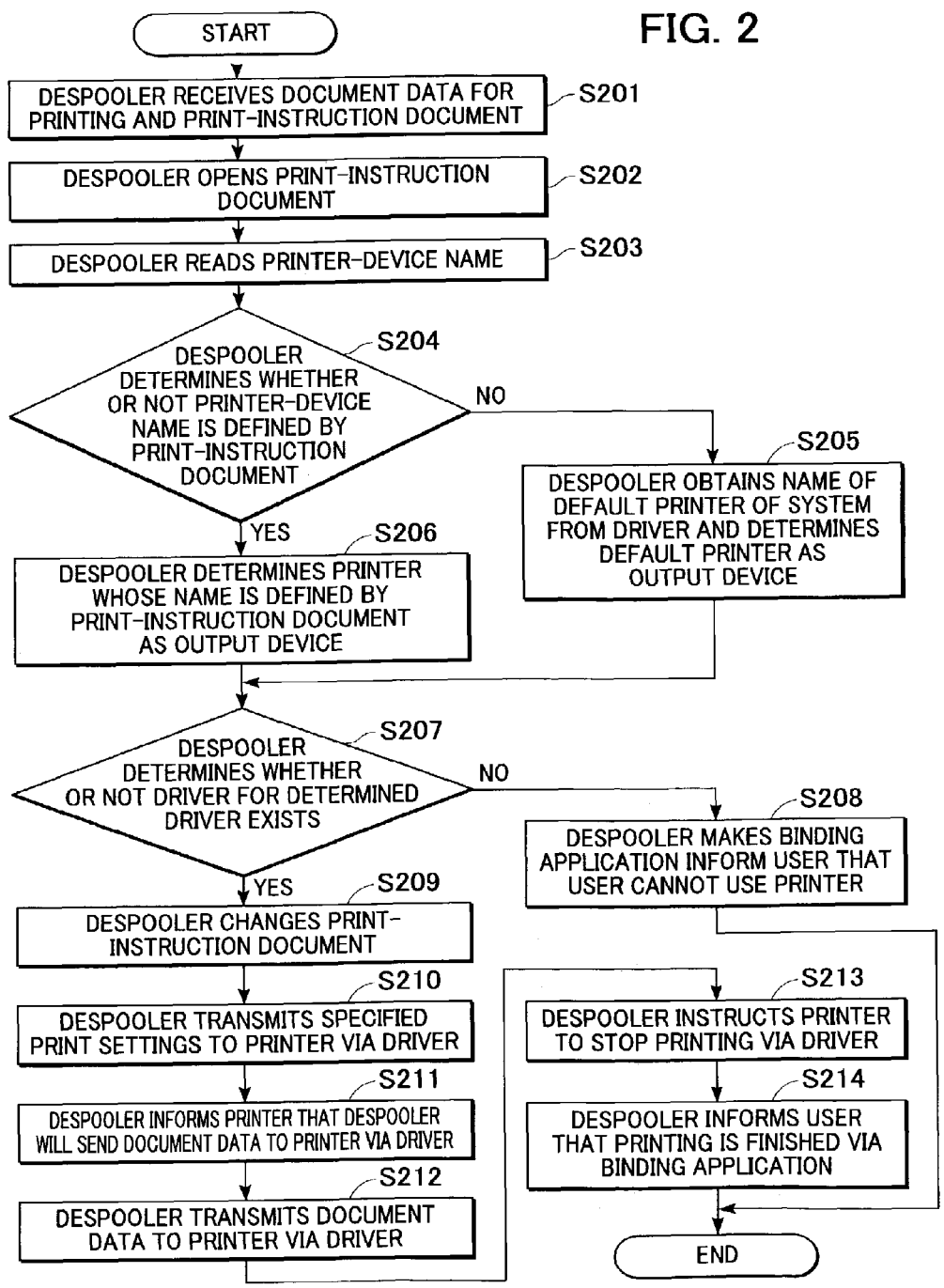
FIG. 2 is a flowchart illustrating typical operations performed by a document-processing system shown in FIG. 1.

FIG. 2 is a flowchart illustrating typical operations performed by the document-processing system shown in FIG. 1.

First, at step S201, the despooler 1105 receives the document data to be printed and the print-instruction document according to an instruction from the user. For example, the document data to be printed includes commands for making an image-processing device form an image, PDL commands, and so forth. At step S202, the despooler 1105 opens the print-instruction document. At step S203, the despooler 1105 reads the printer-device name specified by the print-instruction document. At step S204, the despooler 1105 determines whether or not the printer-device name is defined by the print-instruction document. When the despooler 1105 determines that the printer-device name is not defined at step S204, the despooler 1105 obtains the name of a default printer stored in the host computer 100 at step S205. Then, the despooler 1105 determines that the default printer is the output device and advances to step S207. When the despooler 1005 determines that the printer-device name is defined at step S204, the despooler 1105 determines that the defined printer is the output device at step S206 and advances to step S207.

At step S207, the despooler 1105 obtains the driver names installed in the document-processing system from the memory in the host computer 100 and determines whether or not a driver for the printer (the output device) is installed in the document-processing system. If the despooler 1105 determines that the driver for the printer is not installed at step S207, the despooler 1105 informs the user that the printer cannot be used at step S208.

If the despooler 1105 determines that the driver for the printer exists, the despooler 1105 proceeds to step S209. At step S209, the despooler 1105 checks the print instructions that will be described later and changes the print-instruction document. After forming the print instructions that can be executed, the despooler 1105 transmits setting information for the document data to be printed to the printer via the driver at step S210. Then, the despooler 1105 informs the printer that the despooler 1105 will send the document data to the printer via the driver at step S211. The despooler 1105 expands the document data based on an expansion instruction included in the print-instruction document and transmits the expanded document data to the printer at step S212. Then, the despooler 1105 informs the printer that the despooler 1105 has transmitted the document data to be printed to the printer via the driver at step S213. When the printing is finished, the despooler 1105 informs the user that the printing is finished via the binding application 1104 at step S214.

At step S207, the existence of the printer driver is determined. However, it may be arranged that the despooler 1105 transmits a packet to the printer and determines the existence of the printer according to whether or not the despooler 1105 receives an answer from the printer. Further, at step S208, the despooler 1105 informs the user that the user cannot use the printer. Then, the despooler 1105 waits until the user transmits another instruction. Upon receiving the instruction from the user, the despooler 1105 changes the originally defined printer to a printer for a driver that has been installed in the host computer 100. That is to say, the despooler 1105 changes the originally defined printer to a default printer. Since changing a printer can be automatically performed as required, the user does not have to change his/her original print settings to properly perform printing.

The host computer 100, which serves as an information processing apparatus of the present invention, transmits the print-instruction information to the printer, which serves as an image-forming apparatus of the present invention. The printer processes the document data to be printed. The printer-device name 501 in FIG. 5 corresponds to the printer-device name 401 in FIG. 4, and the name of document data to be printed 502 in FIG. 5 corresponds to the name of document data to be printed 402 in FIG. 4.

The details of the printer-instruction information 403 in FIG. 4 will be described with reference to FIG. 5. The printer instruction 403 corresponds to data 503 to 509. The page number assigned to sheet 503 indicates a page number assigned to each sheet of the document to be printed. The document-processing system of the present invention has a function for reducing the size of the document data to be printed so that two pages can fit onto one sheet. When the printer and the driver thereof use the function, the printer-instruction information 403 informs the printer and the driver thereof of the page number assigned to sheet 503. However, according to the embodiment, the above-described process is performed, based on sheet layout information, by the application used for the document-processing system. That is to say, the page number assigned to sheet 503 is not actually transmitted to the driver as the print instruction. The sheet-feed tray data 504 describes from where the sheets of paper should be supplied. The number of copies to be printed 505 indicates the number of copies to be printed. The sheet-eject tray data 506 indicates where the printed sheets of paper should be discharged. The resolution 507 indicates the resolution for performing printing. The page to be printed 508 indicates the document page to be printed. The sheet-feed cassette information 509 describes which sheet-feed cassette should be used. The print-instruction information may store all the information relating to the printer defined as the output device. For example, if the user wants to feed sheets of paper from an upper sheet-feed cassette, the user may input, for example, "upper cassette" as the sheet-feed cassette information 509. Subsequently, the sheets of paper will always be fed from the upper cassette according to the print instruction. It may be arranged that the despooler 1105 reads such information from the DEVMODE information controlled by the OS and stores it in the printer-instruction information 403. Otherwise, it may 'be arranged that the despooler 1105 reads the' information stored in the printer-instruction information 403 and writes it in the storage area of the HD controlled by the OS.

FIG. 6 illustrates an example of the page-layout information 404 shown in FIG. 4. The page-layout information 404, which is an example of the setting information that controls the printer, is set for the document data to be printed. The page-layout information 404 is controlled by the despooler 1105 (control means) as a table. The leftmost column 600 illustrates row numbers added for description. The table will be described from left to right. Column 601 shows the identification numbers of the sheets of paper. Column 602 shows the size and orientation of the sheets of paper. Column 603 shows whether printing should be performed on the front side of a sheet of paper or the reverse side of the sheet of paper. Column 604 shows the page number printed on each side of the sheet of paper. Column 605 shows an enlargement/reduction factor of the document data. Column 606 shows the positions where the data should be printed. Each item of the page-layout information 403 will be described below. The information on the first line of the table, that is, the information on line 607 will be described from the left in order. First, "sheet 1" is shown as an identification number. The identification number is an identifier that is uniquely assigned to each sheet of paper for printing the electronic-document data specifying each sheet. According to the information written in row 607, printing of document page 1 is accomplished on the front side of the sheet 1, whose size is A4 and whose orientation is vertical, the data of document page 1 is reduced by 70 percent and is printed on the left half of sheet 1. According to the information written in row 608, printing of document page 2 is accomplished on the front side of the sheet 1 whose size is A4 and whose orientation is vertical, the data of document page 2 is reduced by 70 percent and is printed on the right half of the sheet 1. According to the information in these two rows, printing on the front side of the sheet 1 is finished. Then, printing of document pages 3 and 4 is performed based on information in rows 609 and 610.

Figure 3:
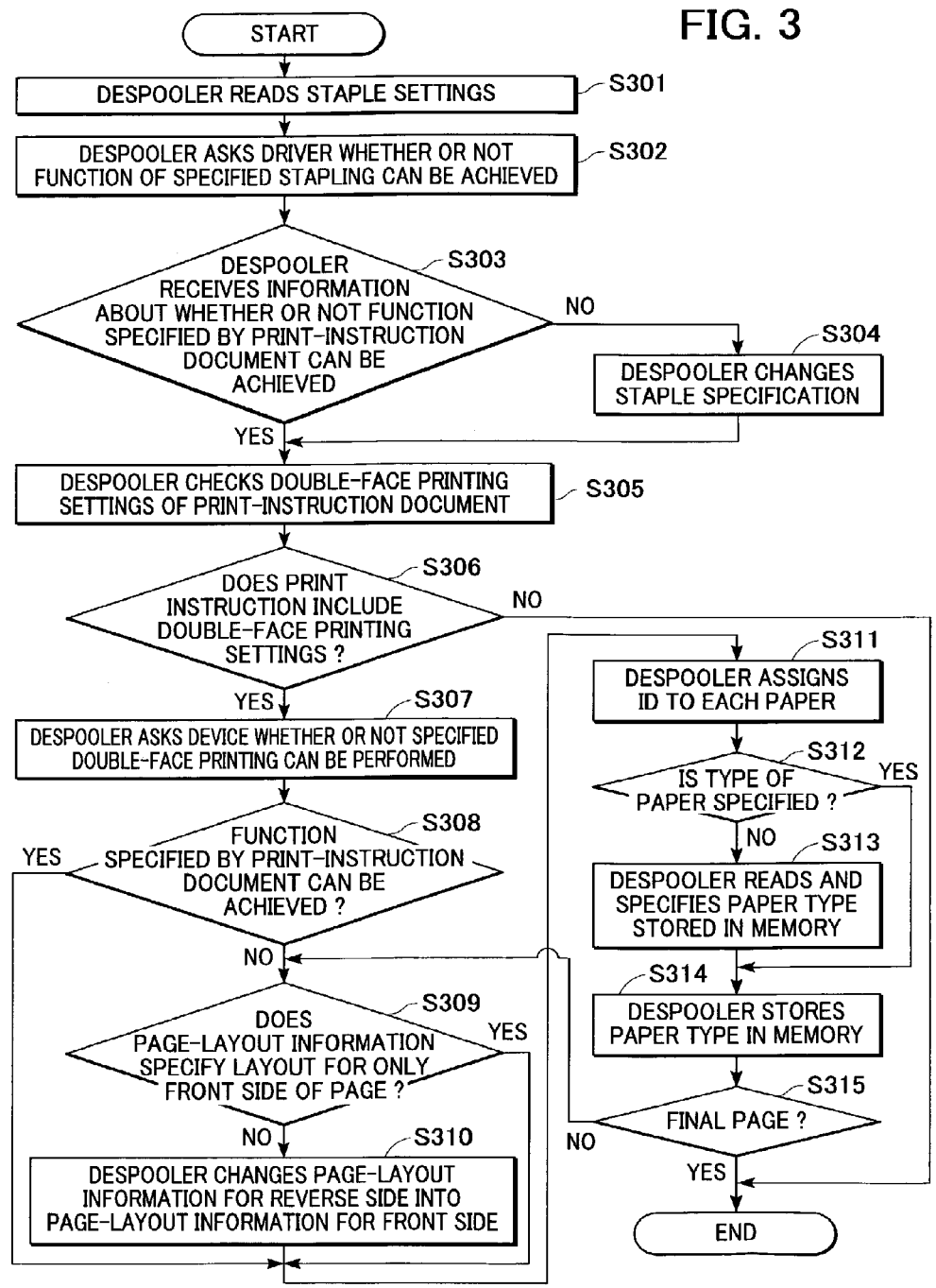
FIG. 3 is a flowchart illustrating processing procedures for changing the print-instruction document.

FIG. 3 is a flowchart illustrating the processing procedures for changing the print-instruction document when the print-instruction document includes an incorrect instruction that cannot be performed by the printer so that the printer does not have to try to perform processing procedures according to the incorrect instruction. Data 510 shown in FIG. 5 indicates a staple instruction. The staple instruction shows the position where stapling should be performed and what type of stapling should be performed. According to the embodiment, the position information and the type information are collectively input as one kind of information. However, the position information and the type information may be treated as separate information. However, the staple instruction is not limited to the example shown in FIG. 5. Any staple information can be used so long as it is set for the document data to be printed and serves as the setting data including information for controlling the function of the printer.

First, at step S301, the despooler 1105 obtains and reads the staple settings from page-layout information shown in FIG. 5. That is to say, the despooler 1105 (a recognition unit) analyzes the print-instruction document that is read and controlled by the despooler 1105 (a control unit) and recognizes the function specified in the print-instruction document, that is, the stapling function. The staple instruction includes information about whether or not stapling is required and information about the position where the stapling should be performed. If the type of stapling can be determined according to the stapling position, the position information and the type information can be written together, as in the above-described example. However, if different kinds of stapling can be performed at the same position, the position information and the type information can be separately written (not shown). Then, at step S302, the despooler 1105 (an obtaining unit) asks the driver for information about the function of the printer connected to the host computer 100. That is to say, the despooler 1105 asks the driver for information about whether or not the printer has a staple function. After receiving an answer from the printer, the despooler 1105 determines at step S303 whether or not the printer can perform the stapling specified by the print-instruction document. When the despooler 1105 (a determination unit) determines that the stapling specified by the print-instruction document can be performed by the printer, the process advances to step S305. When the despooler 1105 determines that the stapling specified by the print-instruction document cannot be performed by the printer, the process advances to step S304. At step S304, the despooler 1105 changes the staple instruction and advances to step S305. For changing the staple instruction, it may be arranged that the stapling position and the stapling type are separately checked. If the staple instruction includes settings that cannot be made, the despooler 1105 may change only the concerned data, or it may change the staple settings so that no stapling is performed. Thus, the setting information can be changed so that the document-processing system can perform printing of a minimum quality. These instructions may be input by using a pointing device, which is an example of an input unit, of the host computer 100.

The setting information for the document data to be printed may have a hierarchical structure. For example, when higher-order setting data is set, lower-order setting data including the details of the higher-order setting data may be set. The higher-order setting data does not necessarily require the lower-order setting data. However, if the lower-order setting is set, it means that the higher-order setting is validated. For example, if there is a part for determining whether or not stapling is needed, and if "yes" is written in that part, there would be a part for determining the position where stapling is performed and a part for determining whether or not double stapling should be performed.

Here, an example where the lower-setting data is set for the electronic-document file is considered. That is to say, an example where double stapling is set as the page-layout information is considered. When the despooler 1105 asks the printer about the printer's function and when the printer answers that the printer cannot perform double stapling, the despooler 1105 asks the printer whether or not the printer can perform stapling according to stapling settings that are higher than double-stapling settings. The despooler 1105 changes the lower-setting data, that is, the double-stapling settings, since it is determined that double stapling cannot be performed. Further, since the despooler 1105 determines that stapling is performed, "yes" is written in the part for determining whether or not stapling should be performed. After that, the despooler 1105 may ask the printer whether or not the stapling process should be performed according to the stapling settings that are higher than the double-stapling settings. If the printer answers that the printer can perform stapling, "yes" is written in the part for determining whether or not stapling should be performed in the page-layout information table. Then, the despooler 1105 transmits the print-instruction document to the printer via the printer driver, and the printer performs printing. It may be arranged that a setting screen for selecting whether printing should be performed based on the higher-order setting or the lower-order setting is displayed on the monitor of the host computer 100 before the print instruction is transmitted to the printer. Then, the user may perform selection and may set the input information for the host computer 100. Further, it may be arranged that the printer be informed of the input information before the printer performs printing.

As described above, the despooler 1105 controls the double-stapling settings as the first setting information for the document data to be printed. Further, the despooler 1105 controls the settings about whether or not stapling is required as the second setting information. The second setting information relates to the double-stapling settings. According to the above-described example, when the printer cannot perform double stapling, the despooler 1105 cancels the double-stapling settings and uses the settings about whether or not stapling is required. Thus, if the printer cannot perform a process specified by the setting information for the document data to be printed, the despooler 1105 can change the details of the page-layout information table for downgrading the printing function so that the printer can continue printing without stopping, according to the information written in the page-layout information table.

FIG. 7 shows the printer instruction 403 after modification. Originally, the stapling setting part 710 shows "yes". However, after the stapling instruction is deleted, "no" is shown in the same part. Although the stapling setting part 710 shows "no" in this drawing for the sake of description, "yes" and "no" can be replaced by predetermined binary variables 1 and 0. As has been described, the despooler 1105 controls the stapling settings and the page-layout such as the front/reverse settings for sheets of paper using the above-described table. Subsequently, when the despooler 1105 obtains the name of a printer to which the document data is to be output, the despooler 1105 reads the necessary information from the table according to the printer functions. For example, if the despooler 1105 receives information from the printer that the printer cannot perform double-sided printing, the despooler 1105 may read information corresponding to the front/reverse settings from the table. If the despooler 1105 receives information that the printer cannot perform stapling, the despooler 1105 may read information corresponding to the stapling settings. Consequently, it becomes possible to reduce unnecessary searches from the table and to use the computer more effectively. Thus, the despooler 1105 can perform image processing more rapidly.

Then, as shown by step S305 of FIG. 3, the despooler 1105 checks the page-layout information. More specifically, the despooler 1105 searches and determines whether or not the front/reverse settings show that double-sided printing should be performed. The settings about double-sided printing serve as a suitable example of document-layout settings. According to the embodiment, whether or not double-sided printing should be performed is determined by searching and reading row 603 shown in FIG. 6 and by determining whether or not there is data to be printed onto the reverse side of the sheet. It may be arranged that the data to be printed onto the reverse side is stored in the printer instruction 403 and the despooler 1105 reads the data therefrom.

At step S306, the despooler 1105 obtains the page-layout information including the setting data and determines whether the document data to be output includes single-sided printing settings or double-sided printing settings. If the despooler 1105 determines at step S306 that all pages of the document are to be printed according to the single-sided printing settings, the despooler 1105 terminates the process. However, if the despooler 1105 determines that the document includes double-sided printing settings, it advances to step S307. At step S307, the despooler 1105 asks the printer whether or not the printer can perform double-sided printing as specified by the document data. At the same time, the despooler 1105 obtains, from the printer via the printer driver, information about the function of the printer, for example, information about whether or not the printer can perform double-sided printing. Otherwise, the despooler 1105 may obtain a list of the printer function from the printer itself via the printer driver. Then, the despooler 1105 may determine whether or not the list includes double-sided printing settings. Based on this determination, the despooler 1105 may determine whether or not the printer can perform double-sided printing. Then, at step S308, the despooler 1105 determines the function of the printer. That is to say, the despooler 1105 determines whether or not the printer can perform the function specified by the print-instruction document. If the printer can perform double-sided printing, the despooler 1105 leaves the print-instruction document untouched and advances to step S311. If the despooler 1105 determines that the printer cannot perform double-sided printing at step S308, the despooler 1105 serving as a modification unit advances to step S309 and performs the process thereafter for each sheet of paper according to the identifier thereof.

When the printer instruction 403 includes the double-sided printing settings, the despooler 1105 may modify the printer instruction 403 beforehand. To modify the page-layout information, the despooler 1105 searches column 603 shown in FIG. 6. As described above, column 603 shows whether printing should be performed on the front side of a sheet of paper or the reverse side of the sheet of paper. At step S309, the despooler 1105 ignores the document data to be printed on the front side and obtains only the document data to be printed on the reverse side. Then, the despooler 1105 determines whether the front/reverse setting in the page-layout settings includes only the front-side settings or whether the front/reverse setting includes not only the front-side settings but also the reverse-side settings. If the reverse-side settings are found in the page-layout settings at step S309, the despooler 1105 advances to step S310. Then, the despooler 1105, serving as a modification and correction unit, changes the reverse-side setting to the front-side setting and advances to step S311. At step S311, the despooler 1105 assigns an ID for each sheet of paper. However, at step S311, if the despooler 1105 finds a sheet of paper with an ID and a sheet of paper with no ID, the despooler 1105 cancels the ID that was already assigned and assigns unique IDs for the concerned pages again. Then, at step S312, the despooler 1105 checks and determines whether or not the type and orientation of paper have been set as shown in the column 602 in FIG. 6. When the despooler 1105 determines that the type and orientation of paper have been set at step S312, the despooler 1105 advances to step S314 and uses these settings. However, when the despooler 1105 determines that the type and orientation of paper have not been set at step S312, the despooler 1105 obtains default sheet settings from a predetermined memory in the host computer 100. Then, the despooler 1105 transmits the obtained default sheet settings so that the page-layout information includes the default sheet settings at step S313. Then, the despooler 1105 stores all the settings in the memory of the document-processing system at step S314. The despooler 1105 determines whether or not the above-described process was performed for the final page at step S315. If the despooler 1105 determines that the above-described process was not performed for the final page, the despooler 1105 goes back to step S309. Otherwise, the despooler 1105 terminates the process.

Thus, the page-layout information 404 and the printer instruction 403, which serve as a suitable example of setting information of the present invention, have been described. According to the description, when the despooler 1105 modifies the page-layout information 404, the despooler 1105 further modifies the printer instruction 403 so that the page-layout information matches with the printer instruction.

As a modification, in the case where the despooler 1105 modifies the printer instruction 403, the despooler 1105 may further modify the page-layout information 404 so that the printer instruction 403 matches with the page-layout information 404.

FIG. 8 shows the table of the page-layout information after modification. Row 803 shows the information set for sheet 2. Row 801 shows information including data "A4 vertical" read from the memory. Row 803, corresponding to the row 609 shown in FIG. 6, shows data of "sheet 2". Subsequently, row 805, corresponding to the row 611 shown in FIG. 6, shows data of "sheet 3". Row 807, corresponding to the row 613 shown in FIG. 6, shows data of "sheet 4". As in the case of row 805, row 807 shows data of "A4 horizontal".

According to this embodiment, the despooler 1105 recognizes that the stapling settings are included in the page-layout information of the print-instruction document. The despooler 1105 determines whether or not the printer can perform stapling specified by the print-instruction document by receiving information about the printer functions from the printer.

As a modification of the above-described embodiment, the despooler 1105 may search the settings in the page-layout information table, which is controlled by the despooler 1105, based on the information about the printer function. The information about the printer function may be obtained by the despooler 1105. That is to say, when the despooler 1105 recognizes that the printer can only perform single-sided printing, the despooler 1105 may search the double-sided printing setting part and the single-sided printing setting part of the page-layout information table for determining whether or not the page-layout information includes double-sided printing settings. If the despooler 1105 determines that the page-layout information includes the double-sided printing settings, the despooler 1105 may change the double-sided printing settings to single-sided printing settings.

Another modification of the above-described embodiment will be described below. When a command for printing an electronic document is input to the host computer 100 via the mouse 13 and the keyboard 12, the despooler 1105 recognizes settings included in the electronic document, for example, stapling settings. Then, the despooler 1105 determines whether or not the printer can perform stapling based on information about the printer functions transmitted from the printer.

Thus, when the print instruction written in the print-instruction document includes an instruction that cannot be performed by the printer, it may be arranged that the despooler 1105 does not transmit the instruction to the printer. Further, the despooler 1105 may modify the page-layout information so that the document data can be properly processed by the printer. Then, the despooler 1105 may transmit the modified page-layout information to the printer. Subsequently, a minimum quality of printing is assured.

Further, by storing the modified print-instruction document, it becomes possible to eliminate the need to check the printer functions for subsequent printing. Even if checking is required, hardly any modification is required since the print instruction has been optimized. Accordingly, the printing process can be rapidly performed.

Thus, when the printer cannot perform the function specified by the print-instruction document, it may be arranged that the despooler 1105 does not transmit the instruction to the printer. Further, the despooler 1105 may modify the page-layout information so that the printer can properly process the document data. Then, the despooler 1105 may transmit the modified page-layout information to the printer. Subsequently, a minimum quality of printing is assured.

Further, if the despooler 1105 determines that the printer cannot perform stapling, double-sided printing, and so forth, the despooler 1105 cancels those settings in the printer instruction 403. For canceling these settings, the despooler 1105 changes the stapling settings in the printer instruction 403 from "ON" to "OFF" and changes the front/reverse settings in the page-layout information from "reverse" to "front", for example.

Figure 9:
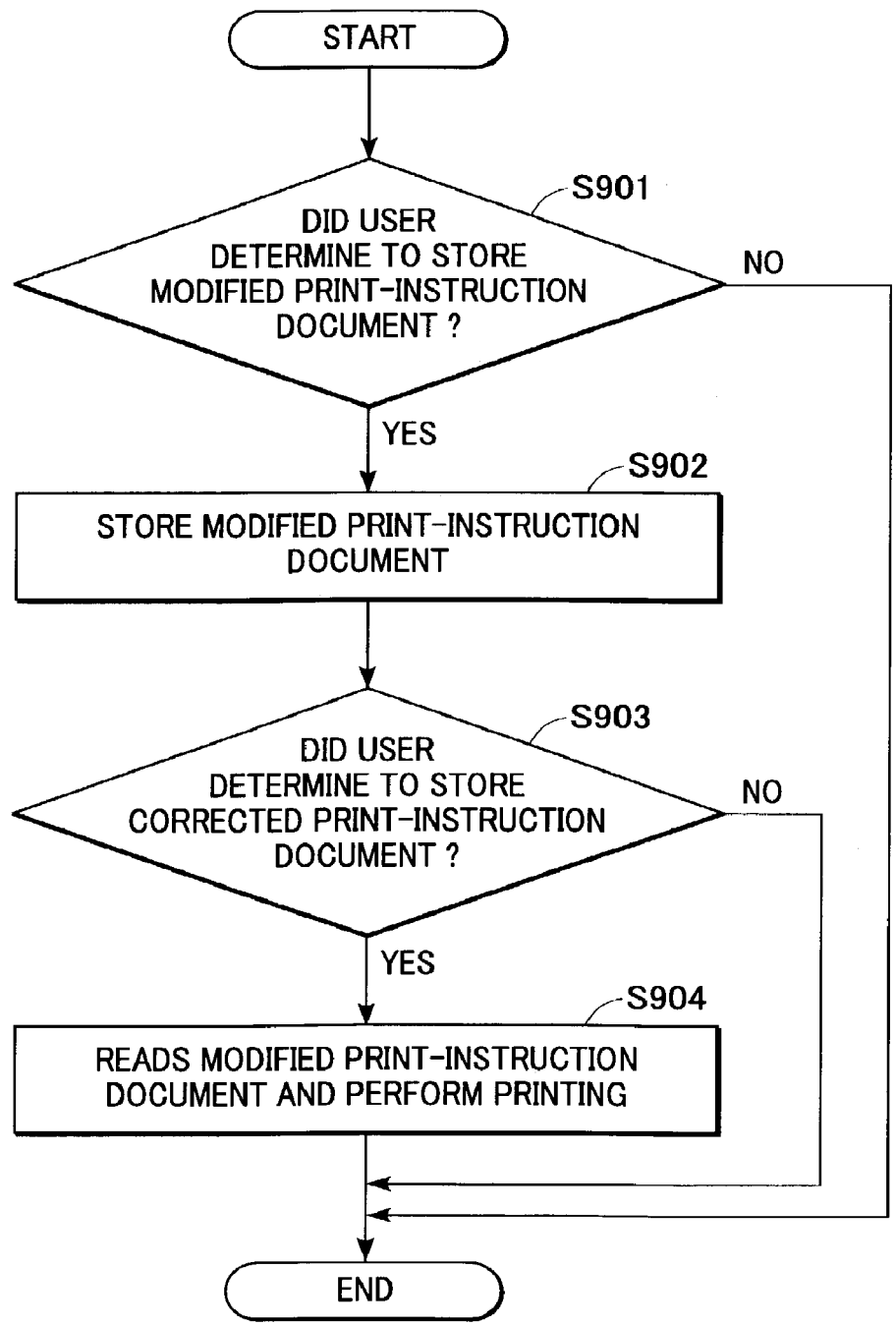
FIG. 9 is a flowchart illustrating processing procedures performed when the modified print-instruction document is stored and reused.

FIG. 9 is a flowchart illustrating the processing procedures performed in the case where the modified print-instruction document is stored and reused. The processing procedures may be performed by the despooler 1105 or by the binding application. It should be noted that the user selects whether or not the modified print-instruction document should be stored separately from the original print-instruction document when the original print-instruction document is modified. Otherwise, it may be arranged that the original print-instruction document is replaced by the modified print-instruction document.

According to the document processing system of the present invention, settings indicating whether or not the modified print-instruction document should be stored are checked. According to the check result, it is determined whether or not the modified print-instruction document should be stored. When it is determined that the modified print-instruction document should be stored at step S901, the process advances to step S902. At step S902, the modified print-instruction document is stored and the process advances to step S903. If it is determined that the modified print-instruction document should not be stored at step S901, the process is terminated. Preferably, the user selects whether or not the original print-instruction document should be overwritten and determines rules for naming a document and a folder for storing the modified print-instruction document. If the user reuses the modified print-instruction document, it may be arranged that whether it is the original print-instruction document or the modified print-instruction document that is clearly displayed on the screen of the CRT of the document-processing system, for example. According to this layout, the user can use the document-processing system more easily.

At step S903, it is determined whether or not the user selects to reuse the modified print-instruction document. If it is determined at step S903 that the user selects to reuse the modified print-instruction document, the process advances to step S904. At step S904, the modified print-instruction document is read and the printing process is performed. If it is determined at step S903 that the user did not select to reuse the modified print-instruction document, the process is terminated.

OTHER EMBODIMENTS

The processing procedures shown in FIGS. 2, 3, and 9 may be performed according to an externally installed program by the host computer 100 and the workstation 1003, which are suitable examples of the information processing apparatus of the present invention. In such a case, the externally installed program may be a program stored in a recording medium such as a CD-ROM, a flash memory, or a floppy disk. Otherwise, the externally installed program may be included in information stored in an external recording medium. Then, the installed program included in the information may be transmitted to the information processing apparatus via a network.

As described above, the recording medium storing the program code of software that can perform the functions described in the above-described embodiments may be supplied to the document-processing system or apparatus. Further, the computer of the system or the apparatus (or the CPU or the MPU thereof) reads and performs the program code stored in the recording medium.

In such a situation, the program code read from the recording medium performs the functions of the present invention. Therefore, the recording medium storing the program code that can be read by the computer forms the present invention. The recording medium for supplying the program code may be a floppy disk, an HD, an optical disk, a magneto-optical disk, a DVD, a CD-ROM, a magnetic tape, a nonvolatile memory card, a ROM, an EEPROM, and so forth.

Further, the functions described in the above-described embodiments may be performed by performing the program code read by the computer. Then, the OS (the operating system) or the like operating on the computer may actually perform part of the process or the all of the process. Subsequently, the functions described in the above-described embodiments may be performed. Otherwise, it may be arranged that the program code read from the recording medium is written in a memory provided in an expansion board inserted in the computer or in an expansion unit connected to the computer. After that, a CPU or the like installed in the expansion board or the expansion unit may actually perform part of the process or the all of the process. Subsequently, the functions described in the above-described embodiment may be performed.

As has been described, according to an aspect of the present invention, when there is a difference between the functions specified by the setting information for the document data to be printed and the functions of the image-forming apparatus (the printer), the image-forming apparatus can properly print and output the document data to be printed without intervention by the user.

While the present invention has been described with reference to what are presently considered to be the preferred embodiments, it is to be understood that the invention is not limited to the disclosed embodiments. On the contrary, the invention is intended to cover various modifications and equivalent layouts included within the spirit and scope of the appended claims. The scope of the following claims is to be accorded the broadest interpretation so as to encompass all such modifications and equivalent structures and functions.

What is claimed is:

1. An information processing apparatus comprising:
   a generation unit constructed to generate an electronic document file including a print-instruction document and document data based on application data;
   a receiving unit constructed to receive the electronic document file including the print-instruction document and the document data based on the application data;
   a modification unit constructed to determine whether a function set in the print-instruction document can be performed or not, not to modify the print-instruction document included in the electronic document file in a case where it is determined that the function set in the print-instruction document can be performed, and to modify the print-instruction document included in the electronic document file in a case where it is determined that the function set in the print-instruction document cannot be performed;
   a storing unit constructed to store the electronic document file including the print-instruction document modified by the modification unit and the document data; and
   a reuse unit constructed to read the electronic document file including the print-instruction document and the document data,
   wherein the modification unit changes a staple setting of the print-instruction document from "On" to "Off" in a case where it is determined that a stapling function cannot be performed, and changes an identification number indicating an identifier assigned to each sheet of the print-instruction document and side information indicating whether printing should be performed on a front side of each sheet or a reverse side of each sheet from "reverse" to "front" in a case where it is determined that a double-sided printing function cannot be performed.

2. The information processing apparatus according to claim 1,
   wherein the modification unit determines whether a double-sided printing function set in the print-instruction document can be performed or not, does not to modify the print-instruction document included in the electronic document file in a case where it is determined that the double-sided printing function set in the print-instruction document can be performed, and changes data on a reverse side of front-reverse information from the reverse side to a front side and reassigns identification information of a sheet of paper in a case where it is determined that the double-sided printing function set in the print-instruction document cannot be performed.

3. An information processing method comprising:
   a generation step of generating an electronic document file including a print-instruction document and document data based on application data;
   a receiving step of receiving the electronic document file including the print-instruction document and the document data based on the application data;

a modification step of determining whether a function set in the print-instruction document can be performed or not, not to modify the print-instruction document included in the electronic document file in a case where it is determined that the function set in the print-instruction document can be performed, and modifying the print-instruction document included in the electronic document file in a case where it is determined that the function set in the print-instruction document cannot be performed;

a storing step of storing the electronic document file including the print-instruction document modified by the modification step and the document data; and a reuse step reading the electronic document file including the print-instruction document and the document data, wherein the modification step changes a staple setting of the print-instruction document from "On" to "Off" in a case where it is determined that a stapling function cannot be performed, and changes an identification number indicating an identifier assigned to each sheet of the print-instruction document and side information indicating whether printing should be performed on a front side of each sheet or a reverse side of each sheet from "reverse" to "front" in a case where it is determined that a double-sided printing function cannot be performed.

4. The information processing method according to claim 3, wherein the modification step determines whether a double-sided printing function set in the print-instruction document can be performed or not, does not to modify the print-instruction document included in the electronic document file in a case where it is determined that the double-sided printing function set in the print-instruction document can be performed, and changes data on a reverse side of front-reverse information from the reverse side to a front side and reassigns identification information of a sheet of paper in a case where it is determined that the double-sided printing function set in the print-instruction document cannot be performed.

5. A non-transitory computer-readable storage medium storing a computer-executable program comprising:

a generation step of generating an electronic document file including a print-instruction document and document data based on application data;

a receiving step of receiving the electronic document file including the print-instruction document and the document data based on the application data;

a modification step of determining whether a function set in the print-instruction document can be performed or not, not to modify the print-instruction document included in the electronic document file in a case where it is determined that the function set in the print-instruction document can be performed, and modifying the print-instruction document included in the electronic document file in a case where it is determined that the function set in the print-instruction document cannot be performed;

a storing step of storing the electronic document file including the print-instruction document modified by the modification step and the document data; and a reuse step of reading the electronic document file including the print-instruction document and the document data, wherein the modification unit changes a staple setting of the print-instruction document from "On" to "Off" in a case where it is determined that a stapling function cannot be performed, and changes an identification number indicating an identifier assigned to each sheet of the print-instruction document and side information indicating whether printing should be performed on a front side of each sheet or a reverse side of each sheet from "reverse" to "front" in a case where it is determined that a double-sided printing function cannot be performed.

6. A non-transitory computer-readable storage medium according to claim 5, wherein the modification step determines whether a double-sided printing function set in the print-instruction document can be performed or not, does not to modify the print-instruction document included in the electronic document file in a case where it is determined that the double-sided printing function set in the print-instruction document can be performed, and changes data on a reverse side of front-reverse information from the reverse side to a front side and reassigns identification information of a sheet of paper in a case where it is determined that the double-sided printing function set in the print-instruction document cannot be performed.

* * * * *